US012412712B2

(12) United States Patent
Murota et al.

(10) Patent No.: US 12,412,712 B2
(45) Date of Patent: Sep. 9, 2025

(54) SWITCH DEVICE

(71) Applicant: KABUSHIKI KAISHA TOKAI RIKA DENKI SEISAKUSHO, Aichi (JP)

(72) Inventors: Masaya Murota, Aichi (JP); Takeshi Fujimoto, Aichi (JP)

(73) Assignee: KABUSHIKI KAISHA TOKAI RIKA DENKI SEISAKUSHO, Niwa-gun (JP)

( * ) Notice: Subject to any disclaimer, the term of this patent is extended or adjusted under 35 U.S.C. 154(b) by 209 days.

(21) Appl. No.: 18/322,589

(22) Filed: May 24, 2023

(65) Prior Publication Data

US 2023/0386768 A1 Nov. 30, 2023

(30) Foreign Application Priority Data

May 27, 2022 (JP) ................................ 2022-087038

(51) Int. Cl.

*H01H 19/24* (2006.01)
*H01H 19/04* (2006.01)
*H01H 19/46* (2006.01)

(52) U.S. Cl.

CPC ............ *H01H 19/24* (2013.01); *H01H 19/04* (2013.01); *H01H 19/46* (2013.01); *H01H 2231/026* (2013.01)

(58) Field of Classification Search

CPC ........ H01H 19/04; H01H 19/24; H01H 19/46; H01H 2231/026; H01H 71/00; H01H 71/02; H01H 71/0214; H01H 2003/12; H01H 2009/02; H01H 2013/00; H01H 2013/02; H01H 2013/04; H01H 2013/50; H01H 2013/52; H01H 2050/02; H01H 2201/01; H01H 2221/00; H01H 2223/00; H01H 2223/002; H01H 1/00; H01H 3/00; H01H 3/02; H01H 3/12; H01H 3/32; H01H 5/00; H01H 5/04; H01H 5/18; H01H 9/02; H01H 9/00; H01H 9/0242; H01H 9/20; H01H 13/00; H01H 13/02; H01H 13/12; H01H 13/14; H01H 13/20; H01H 13/26; H01H 13/36; H01H 13/52; H01H 15/10; H01H 15/16

USPC .......................................................... 200/468

See application file for complete search history.

(56) References Cited

U.S. PATENT DOCUMENTS 5,171,945 A * 12/1992 Su .......................... H01H 13/28 200/6 R
5,459,295 A * 10/1995 Ohta ........................ H01H 1/58 200/461
6,399,908 B1 * 6/2002 Mueller .................. H01H 5/18 200/332

FOREIGN PATENT DOCUMENTS

EP 3618090 A2 * 3/2020 ............ H01H 39/00
JP 2010073662 A 4/2010

* cited by examiner

*Primary Examiner* — Anthony R Jimenez

(57) ABSTRACT

A switch device includes, a movable terminal including a snap action mechanism that bends a spring when a user moves an operating portion, a first fixed terminal that contacts the movable terminal when the spring is not bent, a second fixed terminal that contacts the movable terminal when the operating portion is moved by a specified amount to bend the spring, a case including an opening, and a cover that closes the opening and is separate from the first fixed terminal. When the opening is closed by the cover, the first fixed terminal is positioned in the case by the cover.

7 Claims, 9 Drawing Sheets

| | | P1 | P2 | P3 | P4 |
|---|---|---|---|---|---|
| Positions of Operating Portion | First Operation Position | ○ | ○ | ○ | |
| | Initial Position | ○ | | | ○ |
| | | | ○ | ○ | |
| | Second Operation Position | ○ | | ○ | ○ |

SWITCH DEVICE

BACKGROUND

1. Field

The following description relates to a switch device that switches contacts with a snap action mechanism.

2. Description of Related Art

Japanese Laid-Open Patent Publication No. 2010-73662 discloses a known switch device including a snap action mechanism that is actuated when pressed by an operation member. The switch device of Japanese Laid-Open Patent Publication No. 2010-73662 includes a housing, the operation member, a fixed contact, a movable contact, and the snap action mechanism. The snap action mechanism drives the movable contact when the operation member is pressed to a predetermined position.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a switch device includes a movable terminal including a snap action mechanism that bends a spring when a user moves an operating portion, a first fixed terminal that contacts the movable terminal when the spring is not bent, a second fixed terminal that contacts the movable terminal when the operating portion is moved by a specified amount to bend the spring, a case including an opening, and a cover that closes the opening and is separate from the first fixed terminal. When the opening is closed by the cover, the first fixed terminal is positioned in the case by the cover.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

One embodiment of the present disclosure will now be described.

Switch Unit 1

Figure 1:
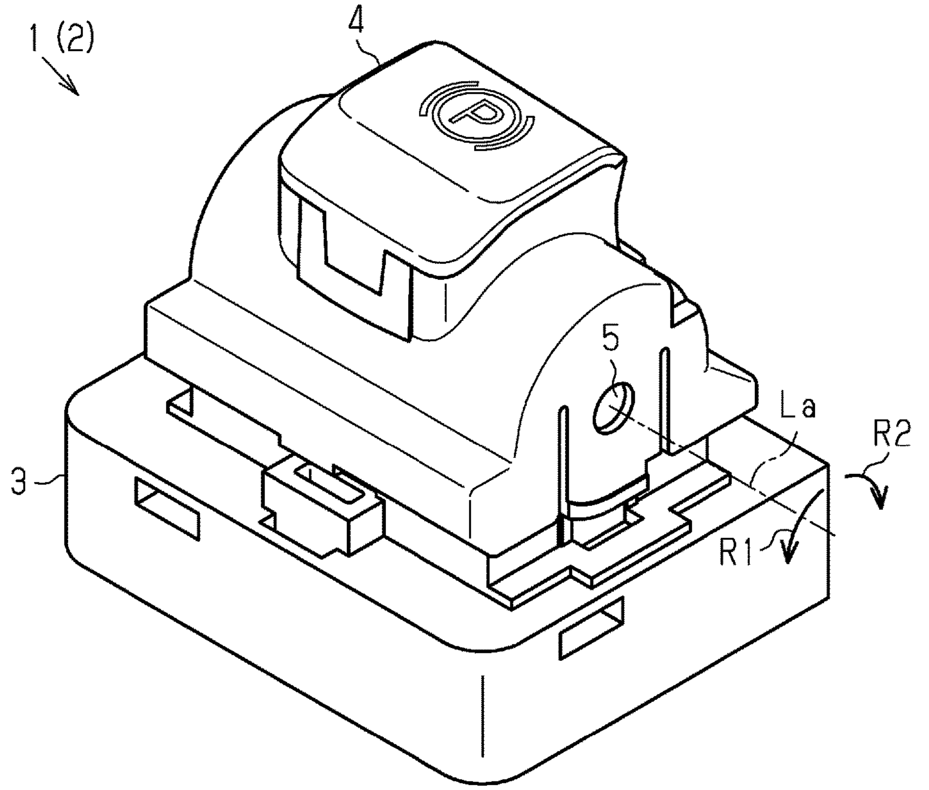
FIG. 1 is a perspective view of a switch unit according to one embodiment.

As shown in FIG. 1, a switch unit 1 is, for example, an electric parking brake switch 2 that is manually moved to electrically activate and deactivate the parking brake of a vehicle. The switch unit 1 is located, for example, inside the passenger compartment (near driver seat) of the vehicle.

The switch unit 1 includes a frame 3 and an operating portion 4 movably attached to the frame 3. The operating portion 4 attached to the frame 3 is rotatable about a shaft 5 arranged in, for example, the frame 3 or the operating portion 4. The operating portion 4 can be rotated in two directions (first operation direction R1, second operation direction R2) about the axis La of the shaft 5. The operating portion 4 is rotated, for example, in the first operation direction R1 or the second operation direction R2 from a neutral position. The operating portion 4 is, for example, of a momentary type in which the operating portion 4 automatically returns to the neutral position when a user releases the operating portion 4 after rotating it from the neutral position.

To activate the parking brake, for example, the user moves the operating portion 4 in the first operation direction R1 from the neutral position while depressing the braking pedal. Movement of the operating portion 4 in the first operation direction R1, for example, raises the operating portion 4. In this case, the parking brake is activated when the operating portion 4 is moved to a first operation position (electric parking brake activation position) at the limit end in the first operation direction R1.

To deactivate the parking brake, for example, the user moves the operating portion 4 in the second operation direction R2 from the neutral position while depressing the braking pedal. Movement of the operating portion 4 in the second operation direction R2, for example, lowers the operating portion 4. In this case, the parking brake is deactivated when the operating portion 4 is moved to a second operation position (electric parking brake deactivation position) at the limit end in the second operation direction R2. The parking brake may be automatically deactivated when, for example, a shifter of the vehicle is set to the drive position and the vehicle starts to travel.

Switch Device 8

Figure 2:
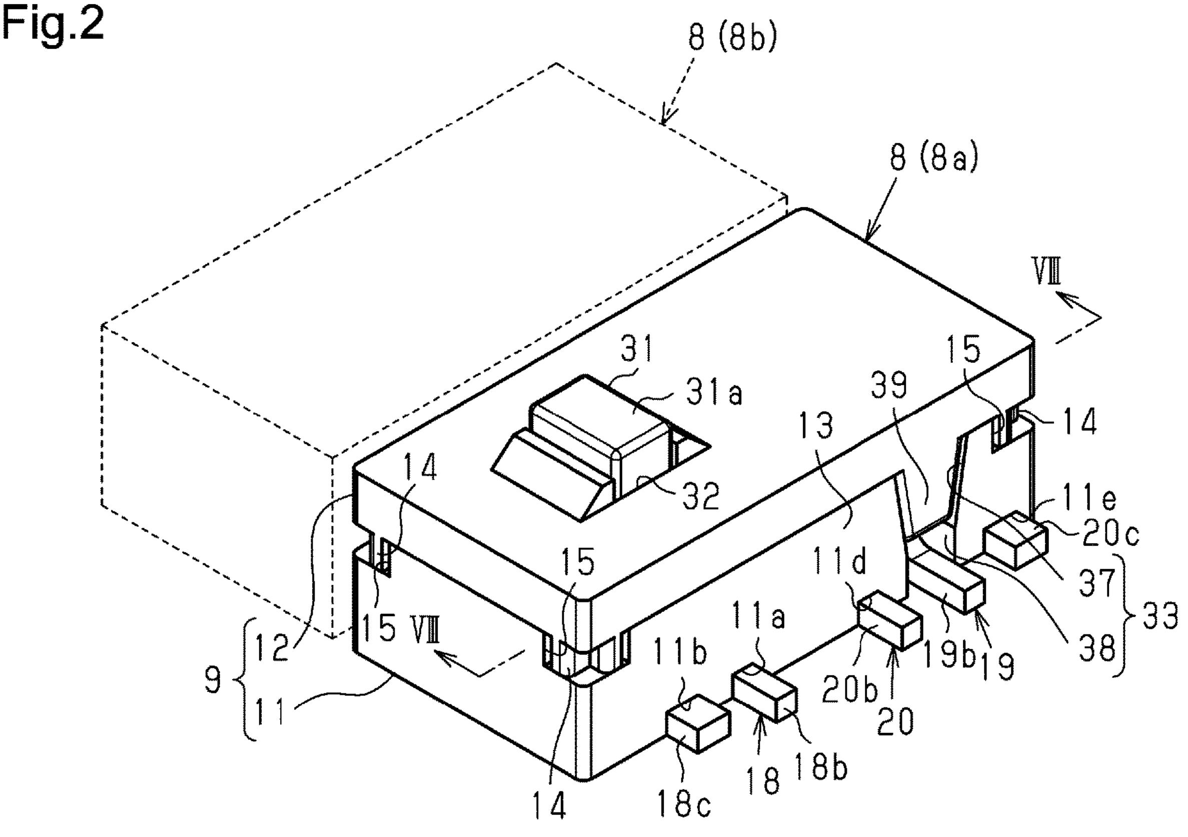
FIG. 2 is a perspective view of a switch device.

As shown in FIG. 2, the switch unit 1 includes switch devices 8 that detect movement of the operating portion 4. The switch devices 8 of the present example include a first switch device 8*a* that detects movement of the operating portion 4 in the first operation direction R1 and a second switch device 8*b* that detects movement of the operating portion 4 in the second operation direction R2. The two switch devices 8 are, for example, arranged next to each other. The switch devices 8 basically have the same structure. The structure of the switch devices 8 will now be described.

The switch device 8 includes a housing 9 that accommodates device components. The housing 9 is substantially a rectangular parallelepiped. The housing 9 includes a case 11, having an opening 10, and a cover 12 that closes the opening 10. The case 11 is, for example, an insulator that insulates electric components of the switch device 8. The case 11 is box-shaped and has a closed end and an opposite end (upper end in present example) that is closer to the cover 12 and includes the opening 10. In one example, the case 11, which is box-shaped, includes a bottom surface that is closed and an upper surface that is open by the opening 10. The case 11 includes two opposing side walls 13. The cover 12 is fixed to the case 11 through, for example, welding. The welding may be laser welding.

Figure 3:
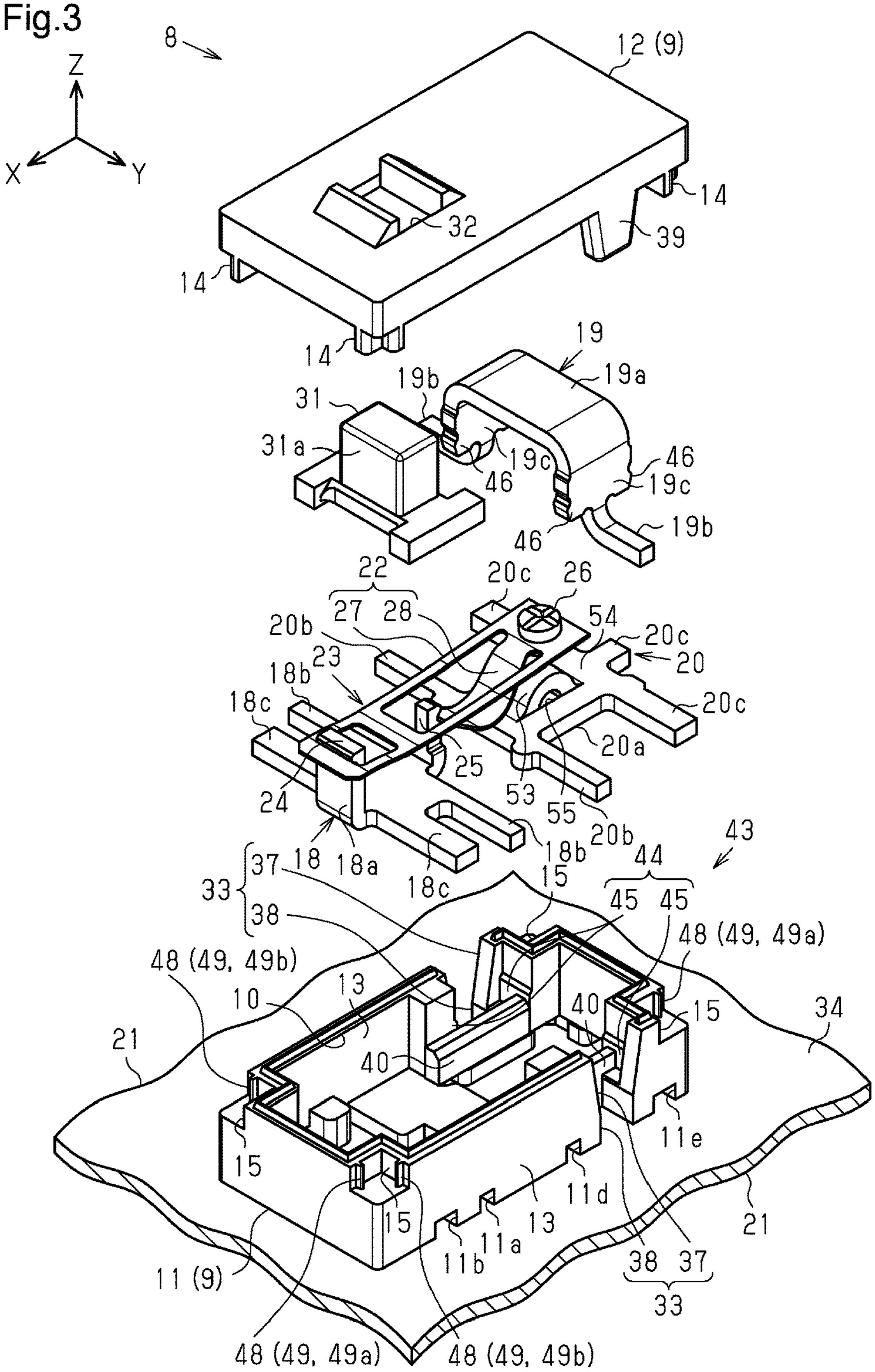
FIG. 3 is an exploded perspective view of the switch device.

As shown in FIG. 3, a leg 14 extends from each of the four corners of the rear surface of the cover 12. The four corners in the open end of the case 11 each include an engagement portion 15 paired with a corresponding one of the legs 14 of the cover 12. The cover 12 is coupled to the case 11 so that the legs 14 are engaged with the corresponding engagement portions 15 of the case 11.

Each switch device 8 includes a movable terminal 18, a first fixed terminal 19, and a second fixed terminal 20. The movable terminal 18 is moved when the user moves the operating portion 4. Further, the movable terminal 18 selectively contacts the first fixed terminal 19 and the second fixed terminal 20. The movable terminal 18 includes a movable terminal body 18*a* and movable terminal connection pins 18*b* mounted on a board 21. Two movable terminal connection pins 18*b* are respectively arranged, for example, at the two sides of the switch device 8 in the width direction (device width direction: Y-axis direction in FIG. 3).

A linking portion 18*c*, used when forming the movable terminal 18 during a pressing process, is arranged adjacent to each movable terminal connection pin 18*b*. The linking portion 18*c* does not have the functionality of a terminal and may be omitted.

The movable terminal connection pins 18*b* extend out of the case 11 through holes 11*a* formed in the side walls 13 of the case 11. The linking portions 18*c* extend out of the case 11 through holes 11*b* formed in the side walls 13 of the case 11.

The movable terminal 18 has a snap action mechanism 23 that bends a spring 22 when the user moves the operating portion 4. The proximal end of the spring 22 is fixed to two engaging portions 24, 25 arranged on the movable terminal body 18*a*. The distal end of the spring 22 includes a movable contact 26 of the movable terminal 18. The movable contact 26 is, for example, a rivet. The rivet of the present example undergoes, for example, a swaging process for attachment to the spring 22. The rivet has the minimum diameter that allows for swaging.

The spring 22 includes a tensile portion 27 that applies tensile force to the proximal end of the spring 22 and a compression portion 28 that applies reaction force in a direction opposite to the direction of tensile force. The proximal end of the tensile portion 27 is engaged with the engaging portion 24, which is located toward one end of the case 11. The proximal end of the compression portion 28 is engaged with the engaging portion 25, which is located at the middle part of the case 11.

A pressing portion 31 moved in cooperation with the operating portion 4 is arranged on the proximal end of the tensile portion 27 opposing the operating portion 4. The pressing portion 31 includes a head 31*a* that is exposed to the outside of the housing 9 through a hole 32 extending through the cover 12. The pressing portion 31 is moved back and forth in the height direction (device height direction: Z-axis direction in FIG. 3) of the switch device 8. The spring 22 bends when the pressed amount of the pressing portion 31 reaches a specified amount.

The first fixed terminal 19 includes a first fixed terminal body 19*a*, which contacts the movable terminal 18, and first fixed terminal connection pins 19*b*, which are arranged at the ends of the first fixed terminal body 19*a*. The first fixed terminal 19 is located closer to the cover 12 than the movable terminal 18. The first fixed terminal body 19*a* is, for example, C-shaped. The first fixed terminal body 19*a* is located at a position opposed to the movable terminal 18.

The first fixed terminal connection pins 19*b* are arranged at, for example, the two ends of the first fixed terminal body 19*a*. The first fixed terminal connection pins 19*b* are pin-shaped and have a narrower width than the first fixed terminal body 19*a*. The first fixed terminal connection pins 19*b* extend out of the case 11 through groove portions 33 formed in the side walls 13 of the case 11. The first fixed terminal connection pins 19*b* are mounted on the board 21.

The second fixed terminal 20 includes a second fixed terminal body 20*a* that contacts the movable terminal 18 and second fixed terminal connection pins 20*b* arranged at the ends of the second fixed terminal body 20*a*. The second fixed terminal 20 is located closer to the bottom of the case 11 than the movable terminal 18. The second fixed terminal body 20*a* is located at a position opposed to the movable terminal 18. The second fixed terminal connection pins 20*b* are arranged at, for example, two opposite ends of the second fixed terminal body 20*a*. The second fixed terminal connection pins 20*b* are mounted on the board 21.

A linking portion 20*c*, used when forming the second fixed terminal 20 during a pressing process, is arranged adjacent to each second fixed terminal connection pin 20*b*. The linking portion 20*c* does not have the functionality of a terminal and may be omitted.

The second fixed terminal connection pins 20*b* extend out of the case 11 through holes 11*d* formed in the side walls 13 of the case 11. The linking portions 20*c* extend out of the case 11 through holes 11*e* formed in the side walls 13 of the case 11.

The movable terminal 18 (excluding spring 22) and the second fixed terminal 20 may be fixed to the case 11 from the lower side. Alternatively, the movable terminal 18 (excluding spring 22) and the second fixed terminal 20 may be insert-molded to the case 11.

Action for Switching Contacts in Switch Device 8

Figure 4A:
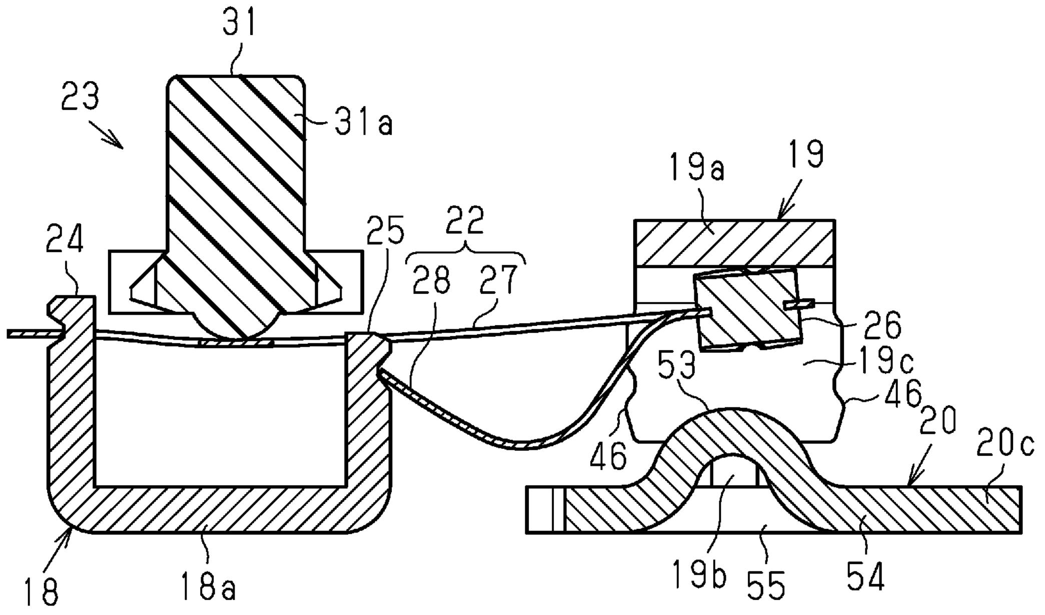
FIG. 4A is a diagram showing an operation of the switch device.

As shown in FIG. 4A, when the operating portion 4 is not moved and located at the neutral position, the spring 22 of the snap action mechanism 23 is not bent. In this case, the resultant force of the tensile force of the tensile portion 27 and the reaction force of the compression portion 28 in the spring 22 acts upward (toward first fixed terminal 19) on the movable contact 26. Thus, the movable contact 26 of the movable terminal 18 contacts the first fixed terminal 19.

Figure 4B:
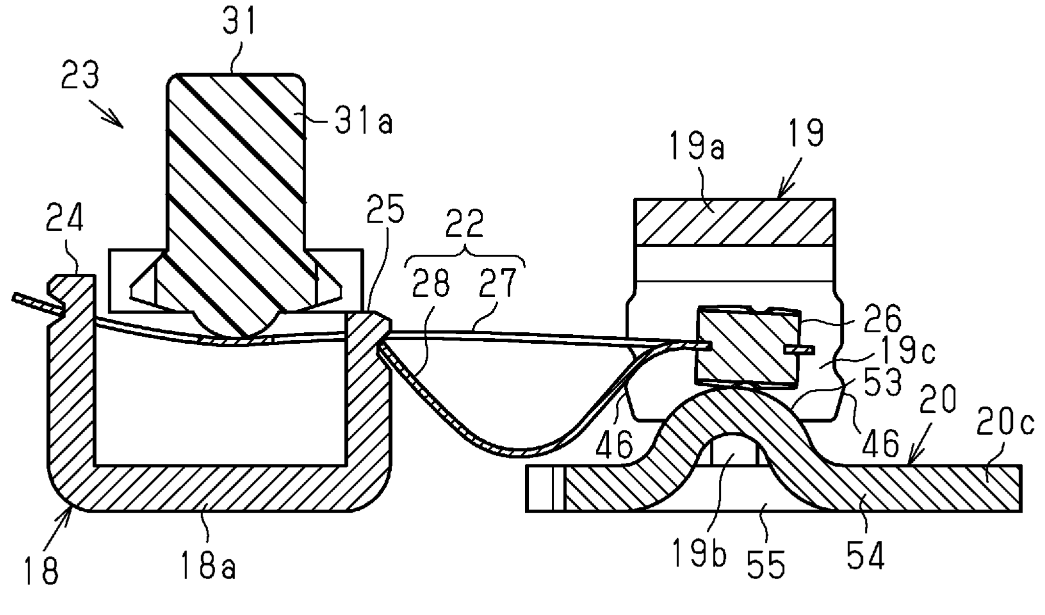
FIG. 4B is a diagram showing an operation of the switch device.

As shown in FIG. 4B, when the operating portion 4 is rotated in the first operation direction R1 (second operation direction R2) thereby pressing the pressing portion 31 so that the operating portion 4 is moved for the specified moved amount, the resultant force of the tensile force and the reaction force acts downward (toward second fixed terminal 20) on the movable contact 26. Thus, the movable contact 26 moves away from the first fixed terminal 19 and contacts the second fixed terminal 20. That is, the connection of the movable terminal 18 switches from the first fixed terminal 19 to the second fixed terminal 20.

When the operating portion 4 is released, the spring 22 bends back to its original state. Thus, the movable contact 26 returns to the state contacting the first fixed terminal 19. In this manner, the movable contact 26 selectively contacts the first fixed terminal 19 and the second fixed terminal 20 in accordance with the moved amount of the operating portion 4.

Structure of First Fixed Terminal 19

As shown in FIG. 3, the first fixed terminal 19 of the present example is separate from, for example, the cover 12. The first fixed terminal 19 is positioned in the case 11 by the cover 12 when, for example, the opening 10 is closed by the cover 12. Specifically, the first fixed terminal 19 is pressed from above by the cover 12 and positioned when coupled to the case 11.

The first fixed terminal connection pins 19*b* are bent in advance in the direction parallel to a mounting surface 34 of the board 21 before the first fixed terminal 19 is coupled to the case 11. In this manner, the first fixed terminal connection pins 19*b* are bent in advance. The first fixed terminal connection pins 19*b* of the present example extend in the horizontal direction (X-Y plane direction in FIG. 3) on the mounting surface 34 of the board 21. Thus, the first fixed terminal connection pins 19*b* are bent in advance when the first fixed terminal 19 is coupled and fixed to the case 11.

Structure of Groove Portions 33

Figure 5:
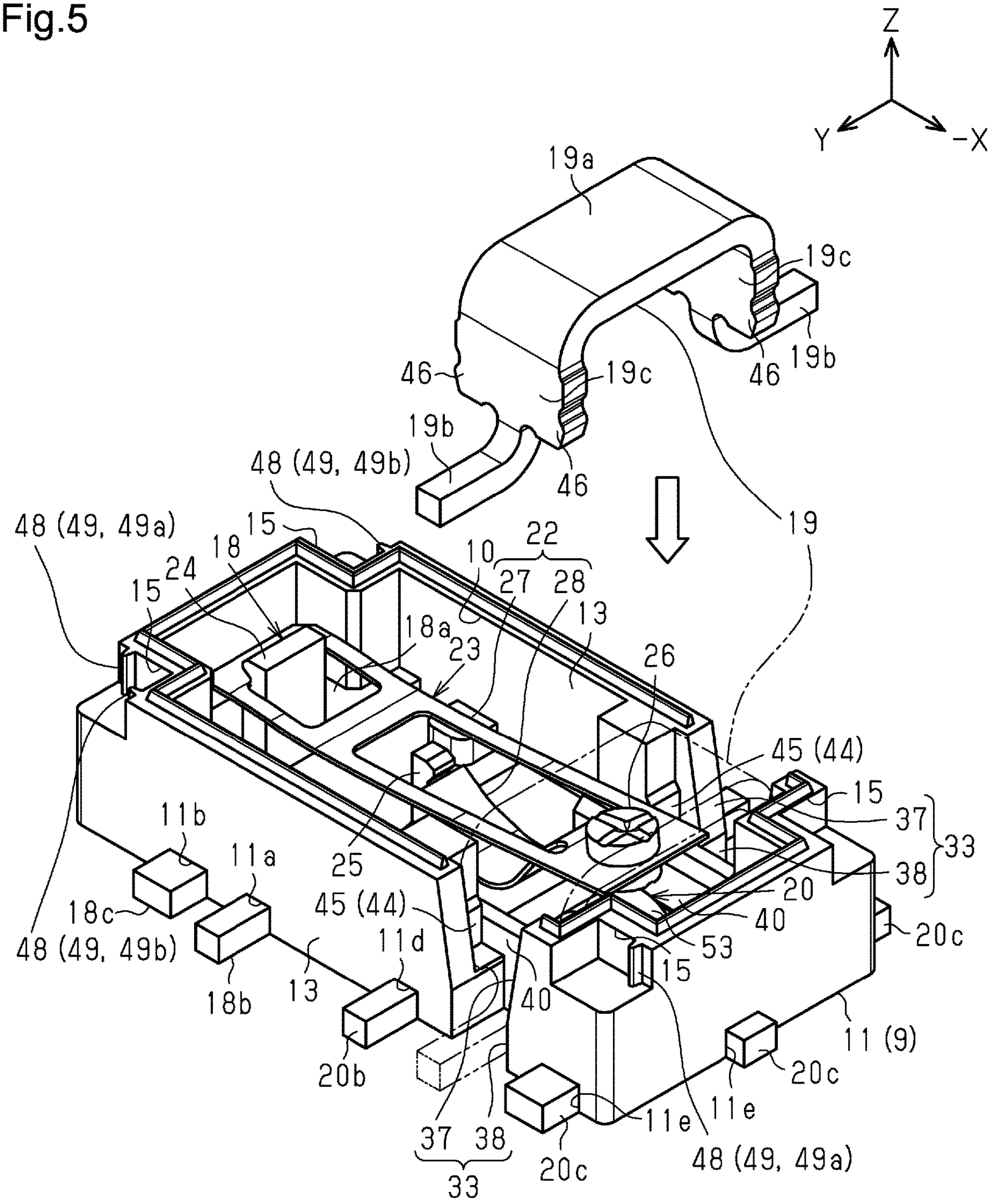
FIG. 5 is a perspective view showing how a first fixed terminal is coupled to a case.
Figure 6:
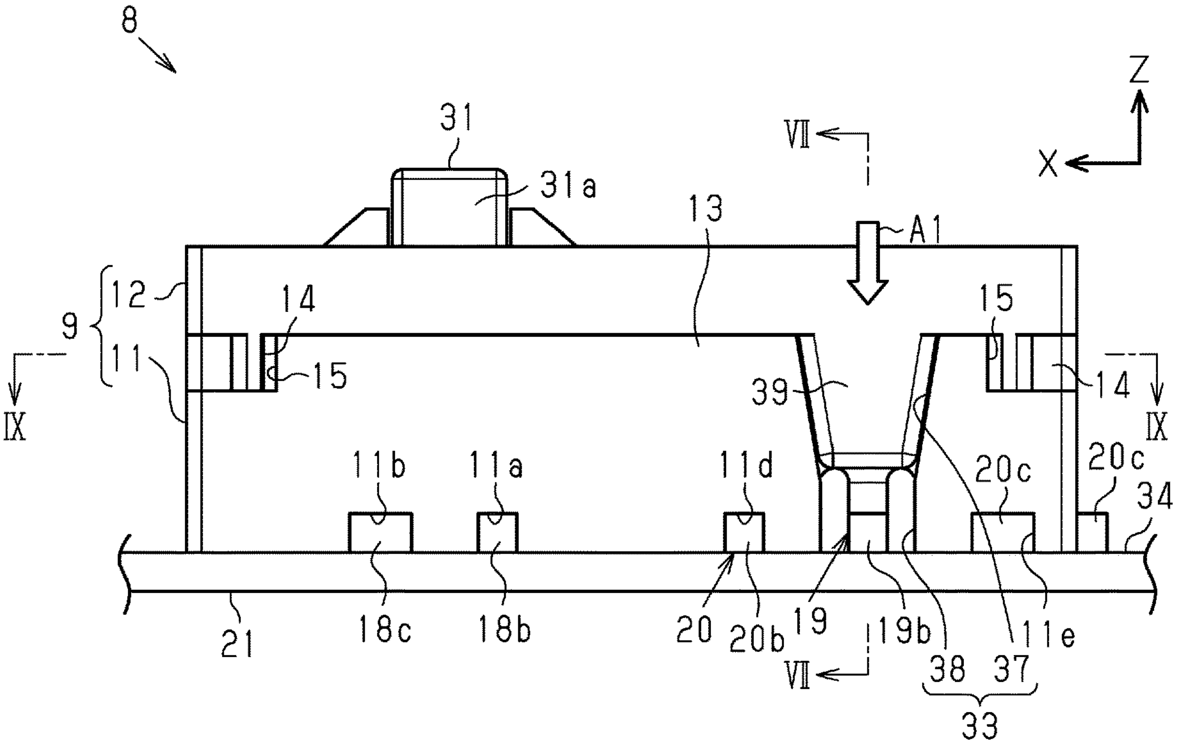
FIG. 6 is a side view of the switch device.

As shown in FIGS. 5 and 6, when coupling the first fixed terminal 19 to the case 11, the groove portions 33 allow for passage of the first fixed terminal connection pins 19*b*. The groove portions 33 of the present example are formed in the two side walls 13. The groove portions 33 each include a guide groove 37 that allows for passage of the corresponding first fixed terminal connection pin 19*b* when coupling the first fixed terminal 19 to the case 11. The guide groove 37 has, for example, a groove width that narrows in the direction (direction A1 indicated by arrow in FIG. 6) the first fixed terminal 19 is coupled to the case 11. In this manner, at least part of the groove portion 33 is narrowed.

The groove portion 33 includes a cutout groove 38 that provides space for the first fixed terminal connection pin 19*b* when coupling of the first fixed terminal 19 to the case 11 is completed. The cutout groove 38 is continuous with, for example, the lower end of the guide groove 37. The groove portion 33 (guide groove 37 and cutout groove 38) extends from the upper end to the lower end in the corresponding side wall 13 of the case 11.

Measures Against Entry of Foreign Material from Groove Portion 33

As shown in FIG. 6, the cover 12 includes projecting walls 39 fitted into at least part of the groove portions 33 when the cover 12 is coupled to the case 11. In one example, each projecting wall 39 is fitted into the corresponding groove portion 33 from the upper end to an intermediate portion in the depth direction of the groove portion 33, for example, to the lower end of the guide groove 37. The projecting wall 39 is formed to project from a rear surface edge of the cover 12 toward the case 11. The two projecting walls 39 are each paired with the corresponding groove portion 33. The projecting walls 39 are each fitted into at least part of the corresponding groove portion 33 to limit entry of foreign material from the groove portions 33 into the housing 9. Each projecting wall 39 of the present example is formed to fit into the guide groove 37 of the corresponding groove portion 33. In this case, the projecting wall 39 is narrowed in conformance with the shape of the guide groove 37.

Figure 7:
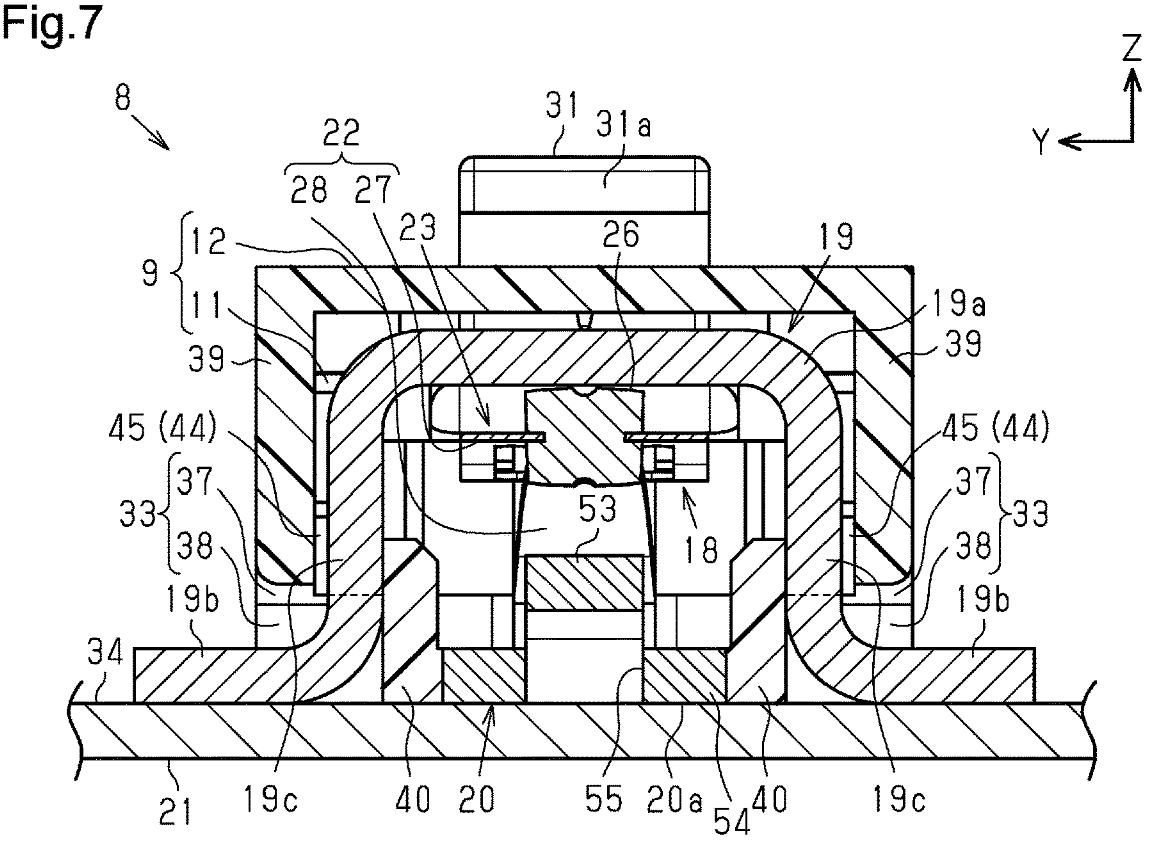
FIG. 7 is a cross-sectional view taken along line VII-VII in FIG. 6.

As shown in FIG. 7, the switch device 8 includes two restriction walls 40 respectively arranged at the inner sides of the groove portions 33 in the case 11. The two restriction walls 40 of the present example are respectively paired with the two groove portions 33. The restriction walls 40 of the present example each project from the case 11 to, for example, partially cover the inner side of the lower end of the corresponding guide groove 37 and entirely cover the corresponding cutout groove 38. The restriction wall 40 partitions each groove portion 33 (guide groove 37, cutout groove 38) from the inside of the case 11 so that foreign material from the groove portion 33 does not enter the case 11.

Arrangement of Connection Pin Group

As shown in FIG. 6, the movable terminal connection pin 18*b* and the second fixed terminal connection pin 20*b* are arranged to extend in the same direction (horizontal direction) as the first fixed terminal connection pin 19*b*. In other words, the movable terminal connection pin 18*b* and the second fixed terminal connection pin 20*b* extend in the same projection direction as the bent first fixed terminal connection pin 19*b*. This allows for surface mounting when the switch device 8 is mounted on the board 21.

In the present example, the linking portions 18*c*, 20*c* are also arranged to extend in the same direction (horizontal direction) as the first fixed terminal connection pin 19*b*. Thus, the movable terminal connection pin 18*b*, the first fixed terminal connection pin 19*b*, the second fixed terminal connection pin 20*b*, and the linking portions 18*c*, 20*c* are all arranged on the same plane.

Press-Fitting Structure of First Fixed Terminal 19

Figure 8:
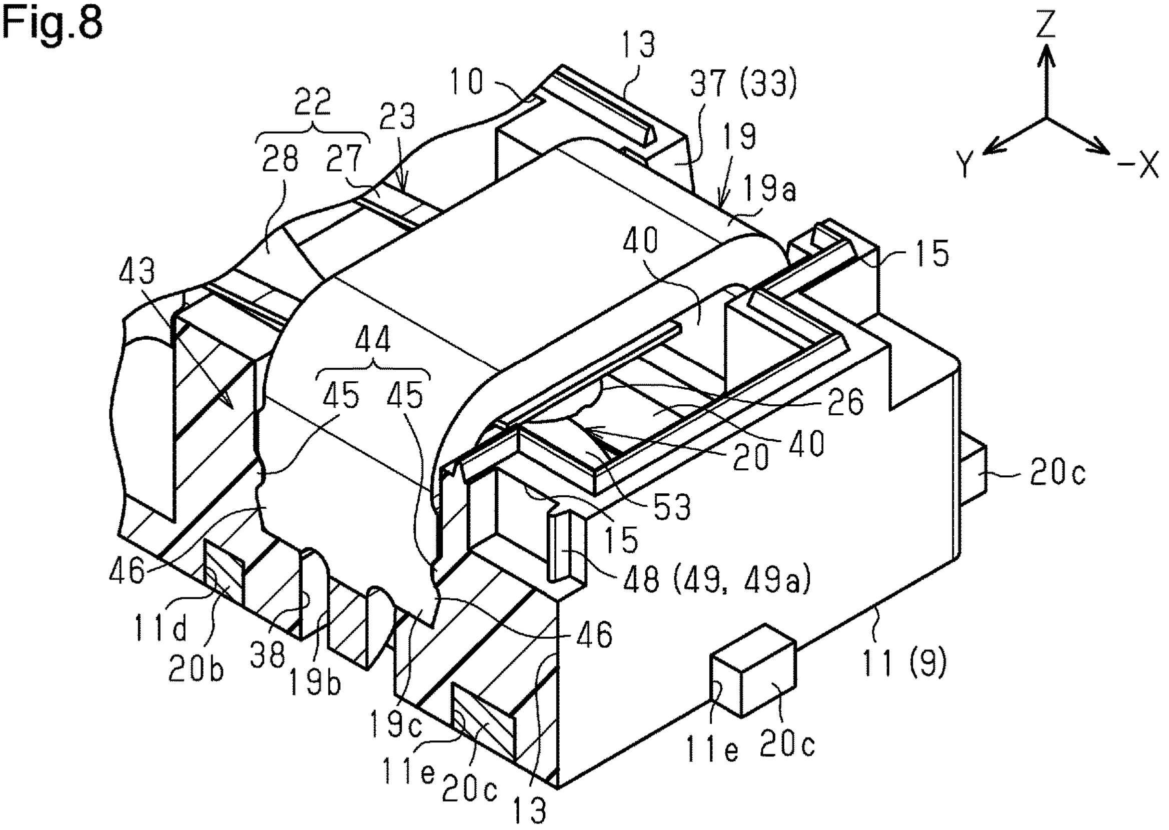
FIG. 8 is a cross-sectional view taken along line VIII-VIII in FIG. 2.

As shown in FIG. 8, the switch device 8 includes a press-fitting mechanism 43 that temporarily fixes the first fixed terminal 19 to the case 11 through press-fitting. The press-fitting mechanism 43 of the present example includes a press-fitting portion 44 formed in the groove portion 33 of the case 11. The press-fitting portion 44 of the present example is arranged in the groove portion 33 next to the guide groove 37. In one example, the press-fitting portion 44 is arranged in the side wall 13 of the case 11 where the groove portion 33 is defined, for example, inside the case 11 at the part where the guide groove 37 is defined. The press-fitting portion 44 is a recessed portion into which a proximal end 19*c* of the first fixed terminal body 19*a* is pressed. The press-fitting portion 44 includes two first catches 45 that are opposed to each other in the recessed portion. Each first catch 45 has a predetermined bulging shape.

The press-fitting mechanism 43 includes two second catches 46 at the proximal end 19*c* of the first fixed terminal 19. The second catches 46 are arranged on the side surfaces of the proximal end 19*c* and have bulging shapes so as to be bulged alternately with the corresponding first catches 45. The press-fitting mechanism 43 temporarily fixes the first fixed terminal 19 to the case 11 by press-fitting the proximal ends 19*c* of the first fixed terminal body 19*a* to the press-fitting portions 44 of the case 11. Thus, when the first catches 45 are press-fitted to the second catches 46 of the case 11, the first fixed terminal 19 is temporarily fixed to the case 11.

Temporary Holding of Cover 12 on Case 11

Figure 9:
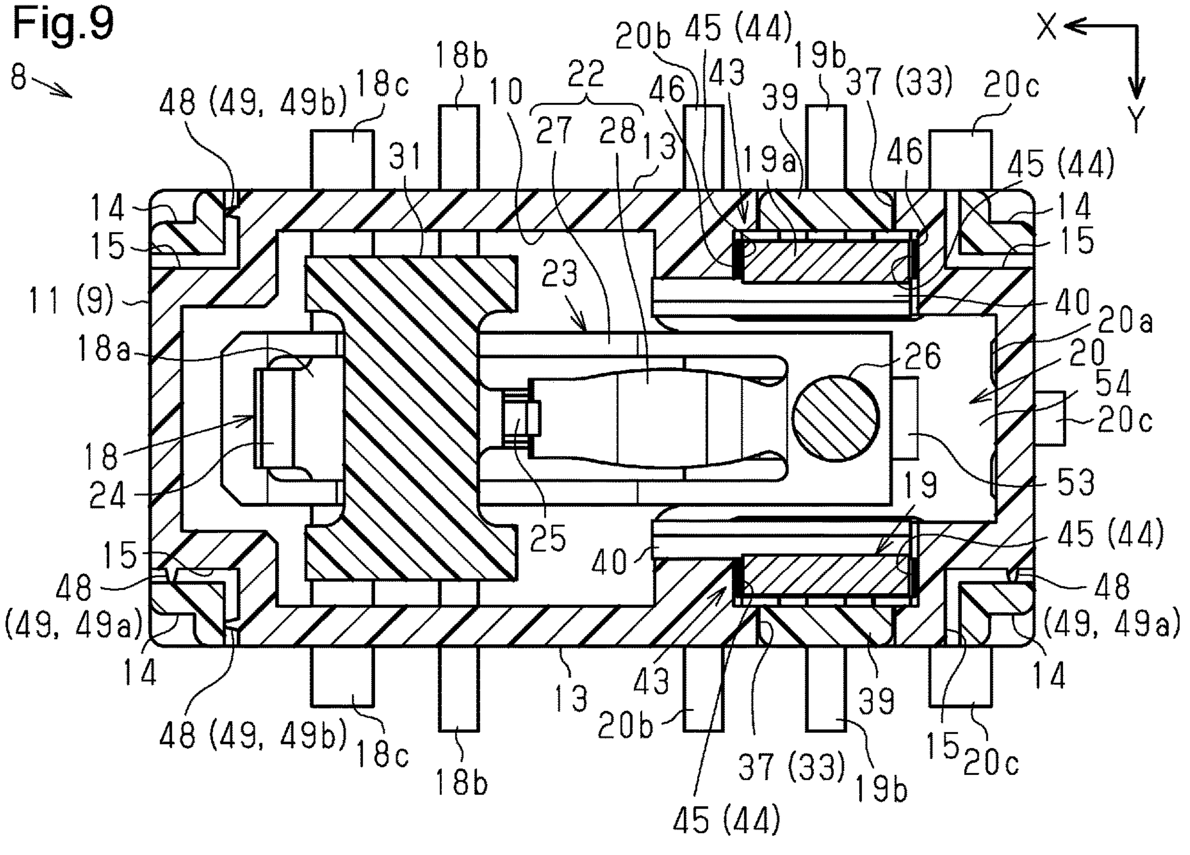
FIG. 9 is a cross-sectional view taken along line IX-IX in FIG. 6.

As shown in FIG. 9, the switch device 8 includes temporary holding portions 48 used to temporarily fix the cover 12, which is coupled to the case 11 to close the opening 10, to the case 11. The temporary holding portions 48 of the present example each include compressible ribs 49 formed on, for example, the side surfaces of the engagement portion 15 of the case 11.

The compressible ribs 49 of the present example are arranged to set the reference position of the case 11 in the device width direction (Y-axis direction in FIG. 9) and the device longitudinal direction (X-axis direction in FIG. 9). Specifically, the compressible ribs 49 include two first compressible ribs 49*a* that set the reference position of the case 11 in the device width direction and two second compressible ribs 49*b* that set the reference position of the case 11 in the device longitudinal direction. In other words, the compressible ribs 49 include the two first compressible ribs 49*a* that position the case 11 at the reference position in the device width direction and the two second compressible ribs 49*b* that position the case 11 at the reference position in the device longitudinal direction. The cover 12 is temporarily fixed to the case 11 by the compressible ribs 49 and then permanently fixed to the case 11 by welding (for example, laser welding).

Pressing of First Fixed Terminal 19 by Cover 12

Figure 10:
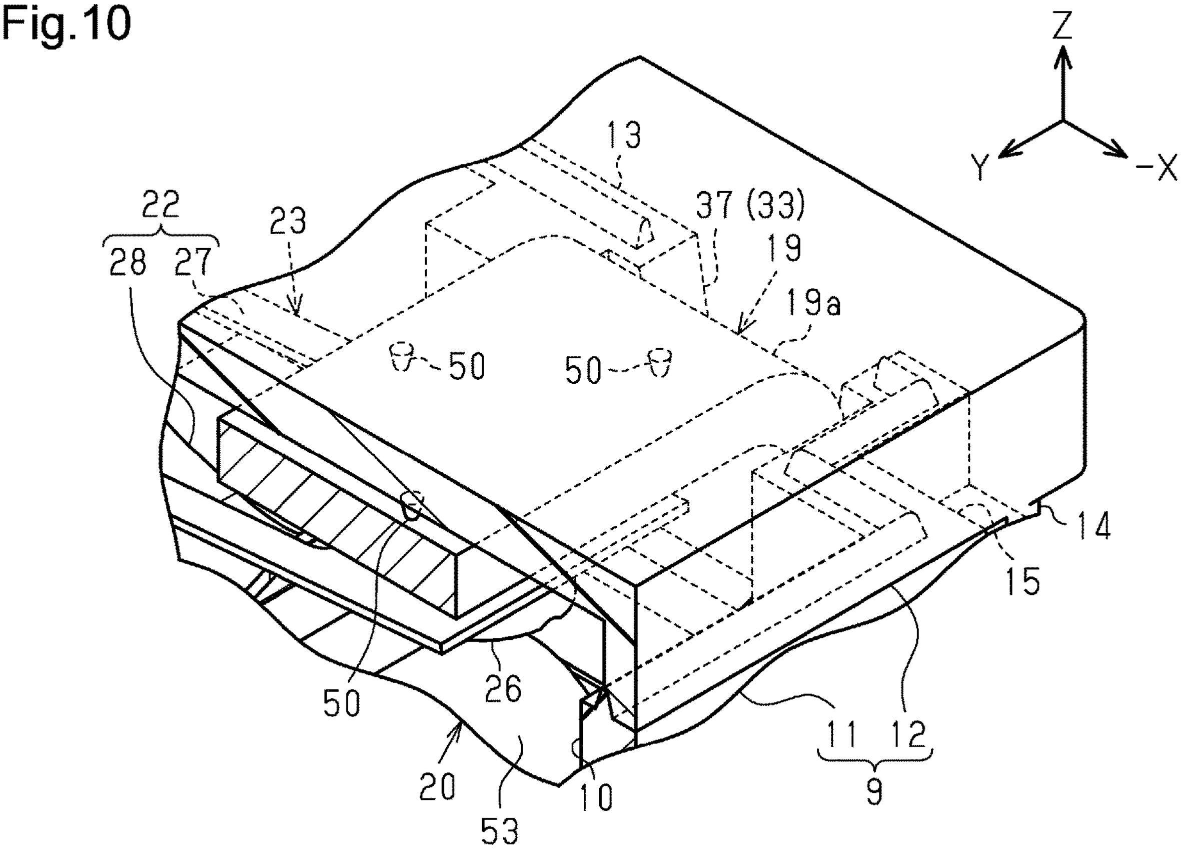
FIG. 10 is a partially enlarged perspective view of the switch device.

As shown in FIG. 10, the cover 12 has a rear surface including compressible ribs 50 to press the first fixed terminal 19 from above when the cover 12 is temporarily fixed to the case 11. In the present example, three ribs 50 are arranged on the cover 12. The ribs 50 press the first fixed terminal 19 from above when the cover 12 is temporarily fixed to the case 11. The ribs 50, for example, hold the first fixed terminal 19 in place until the cover 12 is welded to the case 11.

Detail of Shape of Second Fixed Terminal 20

Figure 11:
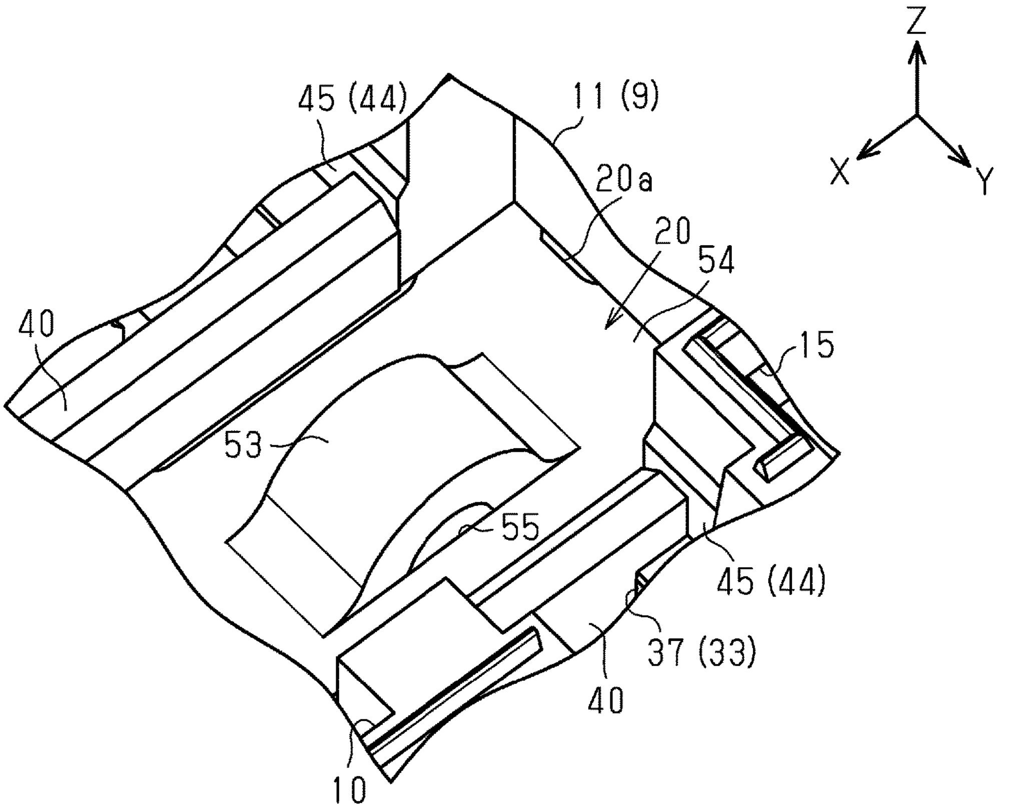
FIG. 11 is a perspective view showing the inside of the case where a fixed contact is arranged.
Figure 12:
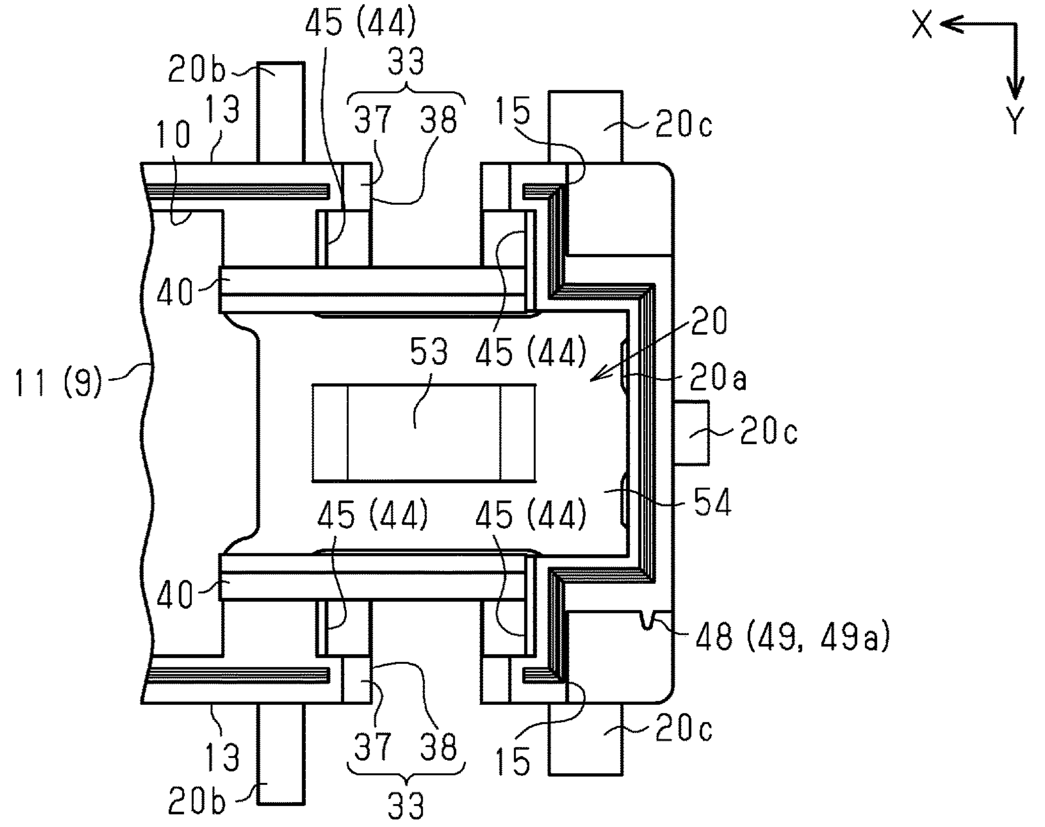
FIG. 12 is a perspective view showing the inside of the case where the fixed contact is arranged.

As shown in FIGS. 11 and 12, the second fixed terminal 20 includes a fixed contact 53, which is a portion that contacts the movable terminal 18, formed by machining part of the second fixed terminal 20. The second fixed terminal 20 contacts the movable contact 26 of the movable terminal 18 at the fixed contact 53. The fixed contact 53 is formed by cutting and bending the base material of the second fixed terminal 20.

As shown in FIG. 11, the fixed contact 53 is shaped to project in a bulging manner toward the movable terminal 18 from a base portion 54 of the second fixed terminal body 20*a*. The fixed contact 53 is shaped to be an arch as viewed from the side (Y-axis direction in FIG. 11). The second fixed terminal 20 includes a cutout hole 55 beneath the fixed contact 53.

Electric Structure of Switch Unit 1

Figure 13:
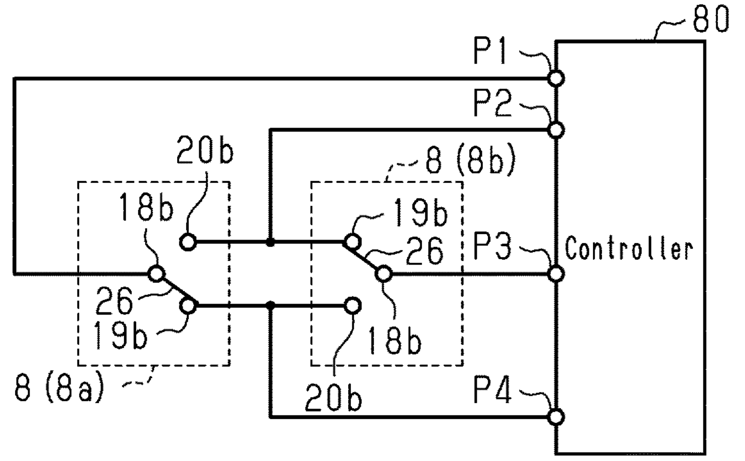
FIG. 13 is a diagram showing the electric configuration of a switch unit.

As shown in FIG. 13, the switch unit 1 includes a controller 80 that detects movement of the operating portion 4 from an output of the switch device 8. The controller 80 is connected to the first switch device 8*a* that detects movement of the operating portion 4 in the first operation direction R1 and the second switch device 8*b* that detects movement of the operating portion 4 in the second operation direction R2. The controller 80 of the present example is connected to the first switch device 8*a* and the second switch device 8*b* by first to fourth ports P1 to P4.

Specifically, in the first switch device 8*a*, the movable terminal connection pin 18*b* is connected to first port P1, the first fixed terminal connection pin 19*b* is connected to fourth port P4, and the second fixed terminal connection pin 20*b* is connected to second port P2. In the second switch device 8*b*, the movable terminal connection pin 18*b* is connected to third port P3, the first fixed terminal connection pin 19*b* is connected to second port P2, and the second fixed terminal connection pin 20*b* is connected to fourth port P4.

Figures 14, 15:
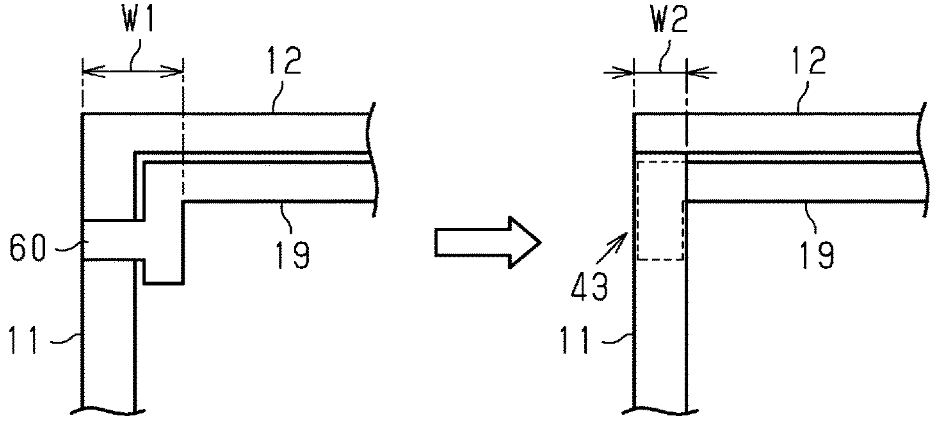
FIG. 14 is a table for determining the state of contacts.
FIG. 15 is a diagram illustrating the switch device reduced in size.

As shown in FIG. 14, when the operating portion 4 is in the neutral position, the movable terminals 18 of the first switch device 8*a* and the second switch device 8*b* are connected to the corresponding first fixed terminals 19. Thus, first port P1 is connected to fourth port P4, and second port P2 is connected to third port P3. When the controller 80 detects this connection state, the controller 80 determines that the operating portion 4 is in the neutral position.

When the operating portion 4 is moved to the first operation position in the first operation direction R1, the connection of the movable terminal 18 is switched from the first fixed terminal 19 to the second fixed terminal 20 only in the first switch device 8*a*. Thus, movement of the operating portion 4 to the first operation position connects first port P1, second port P2, and third port P3. When the controller 80 detects this connection state, the controller 80 determines that the operating portion 4 has been moved to the first operation position. Thus, the movement is detected as activation of the electric parking brake switch 2.

When the operating portion 4 is moved to the second operation position in the second operation direction R2, the connection of the movable terminal 18 is switched from the first fixed terminal 19 to the second fixed terminal 20 only in the second switch device 8*b*. Thus, movement of the operating portion 4 to the second operation position connects first port P1, third port P3, and fourth port P4. When the controller 80 detects this connection state, the controller 80 determines that the operating portion 4 has been moved to the second operation position. Thus, the movement is detected as deactivation of the electric parking brake switch 2.

Operation of Embodiment

The operation of the switch device 8 in the present embodiment will now be described.

As shown in FIG. 3, in the present example, the first fixed terminal 19 is not integrated with the cover 12 and separate from the cover 12. If, for example, the cover 12 were to be integrated with the first fixed terminal 19, two components have to be integrated into a single component. This will lower the yield of the product since a certain number of products may not be able to meet the product requirements. In the present example, the cover 12 and the first fixed terminal 19 are separate components. This will allow the product requirements to be met more readily and improve yield.

As shown in FIG. 8, the first fixed terminal 19 is temporarily fixed to the case 11 through press-fitting. This facilitates positioning of the first fixed terminal 19 and improves the assembling working efficiency of the switch device 8.

As shown in FIG. 15, when the first fixed terminal 19 is coupled through a method other than press-fitting, for example, a flange 60 projecting from the first fixed terminal 19 may be held between the case 11 and the cover 12. However, in this structure, the thickness of the side wall of the switch device 8 that is denoted by W1 will be the thicknesses of the case 11 in addition to the thickness of the first fixed terminal 19. This will hinder device miniaturization. In contrast, the present example fits the first fixed terminal 19 into the case 11. Thus, the thickness of the side wall of the switch device 8 is W2 (<W1) that is the thickness of the case 11 (first fixed terminal 19) alone. This is advantageous for miniaturization (downsizing) of the switch device 8.

As shown in FIG. 5, the distal ends of the first fixed terminal connection pins 19*b* are bent in advance when the first fixed terminal 19 is coupled to the case 11. Thus, bending adjustments can be made more readily than when the first fixed terminal connection pins 19*b* are bent after the first fixed terminal 19 is coupled to the case 11. Further, the first fixed terminal connection pins 19*b* are bent with higher accuracy when bent in advance. This improves the coplanarity accuracy when mounted on the board 21.

The first fixed terminal connection pins 19*b*, which are bent in advance, extend sideward from the first fixed terminal body 19*a*. Thus, the case 11 needs passages that allow for passage of the first fixed terminal connection pins 19*b* without interfering with the first fixed terminal connection pins 19*b*. In the present example, the side walls 13 of the case 11 include the groove portions 33 (specifically, guide grooves 37) so that the first fixed terminal connection pins 19*b* are allowed to pass through the side walls 13.

As shown in FIG. 6, the cover 12 includes the projecting wall 39 to close the groove portion 33. When the side wall 13 of the case 11 includes the groove portion 33, foreign material may enter the case 11 from the groove portion 33. In the present example, the cover 12 includes the projecting wall 39 to close the groove portion 33. This limits entry of foreign material from the groove portion 33.

The extension direction of the pin group including the movable terminal connection pins 18*b*, the first fixed terminal connection pins 19*b*, and the second fixed terminal connection pins 20*b* is parallel to the mounting surface 34 of the board 21. Thus, the switch device 8 is mounted on the board 21 through surface mounting rather than through-hole mounting. This improves the degree of freedom for mounting and allows the switch device 8 to be reduced in size.

Advantages of Embodiment

The switch device 8 in the above embodiment has the following advantages.

(1) The switch device 8 includes the movable terminal 18, the first fixed terminal 19, and the second fixed terminal 20. The movable terminal 18 has the snap action mechanism 23 that bends the spring 22 when the user moves the operating portion 4. The movable terminal 18 contacts the first fixed terminal 19 when the spring 22 is not bent.

The movable terminal 18 contacts the second fixed terminal 20 when the operating portion 4 is moved by a specified amount thereby bending the spring 22. The switch device 8 includes the case 11 that has the opening 10 and the cover 12 that closes the opening 10. The cover 12 is separate from the first fixed terminal 19. The cover 12 closes the opening 10 and positions the first fixed terminal 19 in the case 11.

With this structure, the cover 12 is separate from the first fixed terminal 19. Thus, product requirements will be met more easily than when the cover 12 and the first fixed terminal 19 are integrally manufactured. This improves the yield of the components of the switch device 8.

(2) The switch device 8 includes the press-fitting mechanism 43 that temporarily fixes the first fixed terminal 19 to the case 11 through press-fitting. With this structure, when the switch device 8 is assembled, the first fixed terminal 19 can be temporarily fixed to the case 11 through press-fitting. This allows for easy positioning of the first fixed terminal 19 and facilitates assembly of the switch device 8.

(3) The switch device 8 includes the temporary holding portions 48 that temporarily fix the cover 12, which is coupled to the case 11 to close the opening 10, to the case 11. With this structure, the cover 12 is temporarily held in the case 11 and then fixed to the case 11. Thus, during fixing the cover 12 fixed to the case 11, the cover 12 is not displaced from the case 11. This improves the positioning accuracy when the cover 12 is fixed to the case 11.

(4) The cover 12 has the rear surface including the compressible ribs 50 to press the first fixed terminal 19 from above when the cover 12 is temporarily fixed to the case 11. With this structure, when the cover 12 is placed on the case 11, the ribs 50 of the cover 12 press the first fixed terminal 19 from above to position the first fixed terminal 19. This improves the positioning accuracy of the first fixed terminal 19 relative to the case 11.

(5) The first fixed terminal 19 includes the first fixed terminal body 19*a* that contacts the movable terminal 18 and the first fixed terminal connection pins 19*b* arranged at the ends of the first fixed terminal body 19*a* and mounted on the board 21. The first fixed terminal connection pins 19*b* are bent in advance in the direction parallel to the mounting surface 34 of the board 21 before the first fixed terminal 19 is coupled to the case 11. With this structure, the first fixed terminal connection pins 19*b* are bent in advance before the first fixed terminal 19 is coupled to the case 11. This facilitates bending of the first fixed terminal connection pins 19*b* since only the first fixed terminal 19 undergoes the bending.

Other Embodiments

The present embodiment may be modified as follows. The present embodiment and the following modifications can be combined if the combined modifications remain technically consistent with each other.

The first fixed terminal 19 does not need to include the connection pins at two sides. Instead, the first fixed terminal 19 may include the connection pin only at one side.

The first fixed terminal connection pins 19*b* do not need to be substantially L-shaped. Instead, the first fixed terminal connection pins 19*b* may be shaped to, for example, extend sideward straight from the proximal end 19*c*.

The proximal ends 19*c* of the first fixed terminal 19 do not need to be press-fitted into the case 11. Instead, other portions of the first fixed terminal 19 such as the body portion or the connection pins may be press-fitted into the case 11.

The first fixed terminal connection pins 19*b* of the first fixed terminal 19 do not need to be bent in advance. For example, the first fixed terminal connection pins 19*b* may be bent after the housing 9 is assembled.

The fixed contact 53 of the second fixed terminal 20 may be a rivet that is a component separate from, for example, the base portion 54 of the second fixed terminal 20.

The movable terminal 18 may be any member having the snap action mechanism 23.

The guide groove 37 (groove portion 33) does not need to be narrowed. Instead, the guide groove 37 may be straight or have any other shape.

The groove portion 33 may include, for example, only the guide groove 37.

The groove portion 33 does not need to include the press-fitting portion 44. That is, the press-fitting mechanism 43 may be omitted.

The projecting wall 39 may entirely cover the groove portion 33.

The restriction wall 40 does not need to be arranged in the case 11. Instead, the restriction wall 40 may be arranged on the cover 12.

The height of the restriction wall 40 may be changed.

The cover 12 may be divided into segments with one of the segments structured to position the first fixed terminal 19.

The movable terminal 18, the first fixed terminal 19, and the second fixed terminal 20 may be formed from a single metal plate through pressing or the like.

The contacts do not need to be mounted on the board 21 by planar mounting. Instead, the contacts may be mounted on the board 21 by through-hole mounting.

Application of the switch device 8 is not limited to the electric parking brake. The switch device 8 may be applied to other devices or apparatuses.

The switch device 8 is not limited to an onboard device and may be used for other devices, apparatuses, or systems.

While the present disclosure is described with reference to examples, the present disclosure is not limited to the example or the configuration of the example. The present disclosure includes various variations and modifications within an equivalent range. In addition, various combinations and forms and other combinations and forms, which include only one element or more, shall be within the scope or a range of ideas of the present disclosure.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A switch device, comprising:

a movable terminal including a snap action mechanism that bends a spring when a user moves an operating portion;

a first fixed terminal that contacts the movable terminal when the spring is not bent;

a second fixed terminal that contacts the movable terminal when the operating portion is moved by a specified amount to bend the spring;

a case including an opening;

a cover that closes the opening and is separate from the first fixed terminal, wherein when the opening is closed by the cover, the first fixed terminal is positioned in the case by the cover; and a press-fitting mechanism that temporarily fixes the first fixed terminal to the case when the first fixed terminal is press-fitted to the case.

2. The switch device according to claim 1, further comprising:

a temporary holding portion that temporarily fixes the cover to the case, the cover being coupled to the case to close the opening.

3. The switch device according to claim 1, wherein the cover includes a rear surface including a compressible rib that presses the first fixed terminal from above when the cover is temporarily fixed to the case.

4. The switch device according to claim 1, wherein the first fixed terminal includes:

a first fixed terminal body that contacts the movable terminal; and a first fixed terminal connection pin that is arranged at an end of the first fixed terminal body and configured to be mounted on a board, and the first fixed terminal connection pin is bent in advance in a direction parallel to a mounting surface of the board before the first fixed terminal is coupled to the case.

5. The switch device according to claim 1, wherein the press-fitting mechanism temporarily fixes the first fixed terminal to the case by press-fitting proximal ends of the first fixed terminal to the case.

6. The switch device according to claim 5, wherein the first fixed terminal includes:

a first fixed terminal body that contacts the movable terminal, wherein the first fixed terminal body is C-shaped, the proximal ends of the first fixed terminal are two proximal ends, which are opposed to each other, of the first fixed terminal body; and two first fixed terminal connection pins that are respectively arranged at the two proximal ends of the first fixed terminal body and configured to be mounted on a board.

7. The switch device according to claim 6, wherein each of the two first fixed terminal connection pins is bent in advance in a direction parallel to a mounting surface of the board before the first fixed terminal is coupled to the case.

* * * * *